(12) United States Patent
Iida et al.

(10) Patent No.: US 6,943,822 B2
(45) Date of Patent: Sep. 13, 2005

(54) ELECTRONIC ENDOSCOPE WITH COLOR ADJUSTMENT FUNCTION

(75) Inventors: Mitsuru Iida, Saitama (JP); Haruhiko Hibi, Tokyo (JP); Kenichi Iriyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 378 days.

(21) Appl. No.: 10/165,989

(22) Filed: Jun. 11, 2002

(65) Prior Publication Data
US 2003/0001952 A1 Jan. 2, 2003

(30) Foreign Application Priority Data

Jun. 15, 2001 (JP) ..................................... P2001-181249

(51) Int. Cl.[7] .............................................. H04N 7/18
(52) U.S. Cl. ............................. 348/65; 348/68; 348/71
(58) Field of Search ..................................... 348/65–76

(56) References Cited

U.S. PATENT DOCUMENTS 5,408,265 A * 4/1995 Sasaki .......................... 348/70
6,181,368 B1   1/2001 Takahashi et al.
6,414,710 B1 * 7/2002 Takahashi et al. ............. 348/69

* cited by examiner

Primary Examiner—Andy Rao
(74) Attorney, Agent, or Firm—Greenblum & Bernstein, P.L.C.

(57) ABSTRACT

An electronic endoscope includes a video-scope with an image sensor and a video-processor, to which the video-scope is detachably connected. The electronic endoscope has a light source that emits illuminating light for illuminating a subject, a color adjuster that performs a color adjustment process for color image signals read from the image sensor, which include a plurality of color signal components corresponding to a plurality of color elements, and a light source detector that detects the type of the light source. The color adjuster performs the color adjustment process in accordance with the type of the light source such that color in displayed subject image is properly reproduced.

10 Claims, 5 Drawing Sheets

FIG. 3

| ADDRESS | DATA NAME | |
|---|---|---|
| E000h | B MTX | |
| · | R MTX | |
| · | B GAIN | |
| · | R GAIN | |
| · | B CONT | KD |
| · | R CONT | (COLOR ADJUSTMENT DATA FOR XENON LAMP) |
| · | C LEVEL | |
| · | C-γ CONT | |
| · | Cr HUE | |
| · | Cb HUE | |
| · | Cr GAIN | |
| E00Bh | Cb GAIN | |
| E100h | B MTX | |
| · | R MTX | |
| · | B GAIN | |
| · | R GAIN | |
| · | B CONT | MD |
| · | R CONT | (COLOR ADJUSTMENT DATA FOR METAL HALIDE LAMP) |
| · | C LEVEL | |
| · | C-γ CONT | |
| · | Cr HUE | |
| · | Cb HUE | |
| · | Cr GAIN | |
| E10Bh | Cb GAIN | |
| E200h | B MTX | |
| · | R MTX | |
| · | B GAIN | |
| · | R GAIN | |
| · | B CONT | HD |
| · | R CONT | (COLOR ADJUSTMENT DATA FOR HALOGEN LAMP) |
| · | C LEVEL | |
| · | C-γ CONT | |
| · | Cr HUE | |
| · | Cb HUE | |
| · | Cr GAIN | |
| E20Bh | Cb GAIN | |

ELECTRONIC ENDOSCOPE WITH COLOR ADJUSTMENT FUNCTION

BACKGROUND OF THE INVENTION

1. Field of the Invention

The present invention relates to an electronic endoscope for observing an internal organ, especially, it relates to a color-adjustment process for image signals read from an image sensor.

2. Description of the Related Art

A lamp for illuminating a subject is provided in an electronic endoscope. Light emitted from the lamp passes through a fiber-optic bundle provided in a video-scope, and is directed to the distal end of the video-scope. The light emitted from the distal end of the video-scope is reflected on a subject, thus a subject image is formed on an image sensor (for example, CCD (Charge-Coupled Device)) provided at the distal end of the video-scope.

Generally, to display a color subject image on a monitor, an R, G, B sequential system using a rotating color filter or an on-chip color filter method using an on-chip color filter is used in the imaging process. Thus, image signals corresponding to the primary colors (R, G, B) or image signals corresponding to the complementary colors are generated and then read from the image sensor. A color adjustment process including a white balance adjustment, and so on, is performed to the read image signals, so that the subject image is reproduced on the monitor with proper color.

For the lamp, generally, a xenon lamp, a metal halide lamp, or a halogen lamp is used, and each lamp has a particular spectrum distribution. For example, light emitted from the halogen lamp includes a lot of light-components with wavelength corresponding to the color yellow. Consequently, the light with a color close to yellow color is emitted. On the other hand, the xenon lamp emits light close to daylight. Accordingly, color signal components in the image signals vary with different spectrum distributions, in other words, the difference of the type of lamp. To adjust the color balance of the subject image displayed on a monitor, a color adjustment process is performed in accordance with the spectrum distribution.

However, when a signal processing circuit is manufactured in accordance with a particular lamp, the lamp cannot be exchanged for an other type of lamp without modifying the signal processing circuit. When using other types of lamps, an improper color adjustment process is performed, so that color in the subject image cannot be properly reproduced. Accordingly, an electronic endoscope should be designed and manufactured for each type of lamp.

SUMMARY OF THE INVENTION

Therefore, an object of the present invention is to provide an electronic endoscope that is capable of adjusting a color adjustment process in accordance with the type of lamp.

An electronic endoscope of the present invention includes a video-scope with an image sensor and a video-processor. The video-scope is detachably connected to the video-processor. The electronic endoscope has a light source, a color adjuster, and a light source detector. The light source emits illuminating light for illuminating a subject, thus a subject image is formed on the image sensor. To display a color subject image on a monitor, for example, a color filter is provided between the light source and the image sensor. The color filter has a plurality of color elements (for example, primary color elements, or complementary color elements) to generate color image signals including a plurality of color signal components, which correspond to the plurality of color elements. The color image signals, generated in the image sensor, are read, and the color adjuster performs a color adjustment process on the color image signals to generate video signals. In accordance with the video signals, the color image is displayed on the monitor.

For the light source, for example, an electronic discharge lamp (gas lamp), such as a xenon lamp, a metal halide lamp, or a halogen lamp, and so on, is applied. Each lamp has a particular spectrum distribution. The light source detector detects the type of the light source, and then the color adjuster performs the color adjustment process in accordance with the type of the light source such that color in displayed subject image is properly reproduced. As the color adjustment process is performed in accordance with the type of light source, proper color is always reproduced in the displayed subject image for any type of light source, without modifying the signal circuit.

Preferably, the color adjuster is provided in the video-scope. In this case, a common video-scope can be used for a plurality of video-processors, each of which has different light source.

In the color adjustment process, at least a white balance process is performed. Namely, the color adjuster includes a white balance adjuster that uses gain control to adjust the relative ratio of R, G, and B signal components generated from the color image signals. In this case, the color adjustment process is performed in accordance with the gain data. Therefore, preferably, the video-scope includes a color-adjustment-data memory for storing a series of color adjustment data corresponding to plural types of light sources. The set of color adjustment data corresponding to the type of the light source is selected from the series of color adjustment data and is read from the color-adjustment-data memory. The color adjuster performs the color adjustment process in accordance with the set of color adjustment data.

For example, when the light source is provided in the video-processor, the color adjuster has a memory area for loading and storing the set of color adjustment data, and the video-processor has a light source memory for storing light source data. Further, the video-scope includes a data setter that sets the set of color adjustment data, namely, stores the set of color adjustment data in the memory area. The light source detector detects the type of the light source in accordance with the light source data and the data setter sets the set of color adjustment data corresponding to the light source data when the video-scope is connected to the video-processor.

In addition to the white balance adjustment, the color adjuster has, for example, a primary color signal generator, a gamma corrector, and a video signal generator. The primary color signal generator generates primary color image signals composed of R signal components corresponding to the color Red, G signal components corresponding to the color Green, and B signal components corresponding to the color Blue, on the basis of the color image signals read from the image sensor. The gamma corrector performs a gamma correction for the white balance adjusted primary color image signals. The video signal generator generates the video signals including luminance signals and color difference signals on the basis of the gamma corrected primary color image signals.

A video-scope of the present invention is provided in an electronic endoscope having a light source for illuminating a subject. The video-scope has an image sensor and is detachably connected to the video-processor. The video-scope has a color adjuster that performs a color adjustment process for color image signals read from the image sensor, and a light source detector that detects the type of the light source. The color image signals include a plurality of color signal components corresponding to a plurality of color elements, video signals being generated on the basis of the color image signals. The color adjuster performs the color adjustment process in accordance with the type of the light source such that color in displayed subject image is properly reproduced.

BRIEF DESCRIPTION OF THE DRAWINGS

The present invention will be better understood from the description of the preferred embodiment of the invention set fourth below together with the accompanying drawings, in which:

FIG. 3 is a view showing a table associated with color adjustment data stored in an EEPROM.

DESCRIPTION OF THE PREFERRED EMBODIMENTS

Hereinafter, the preferred embodiment of the present invention is described with reference to the attached drawings.

Figure 1:
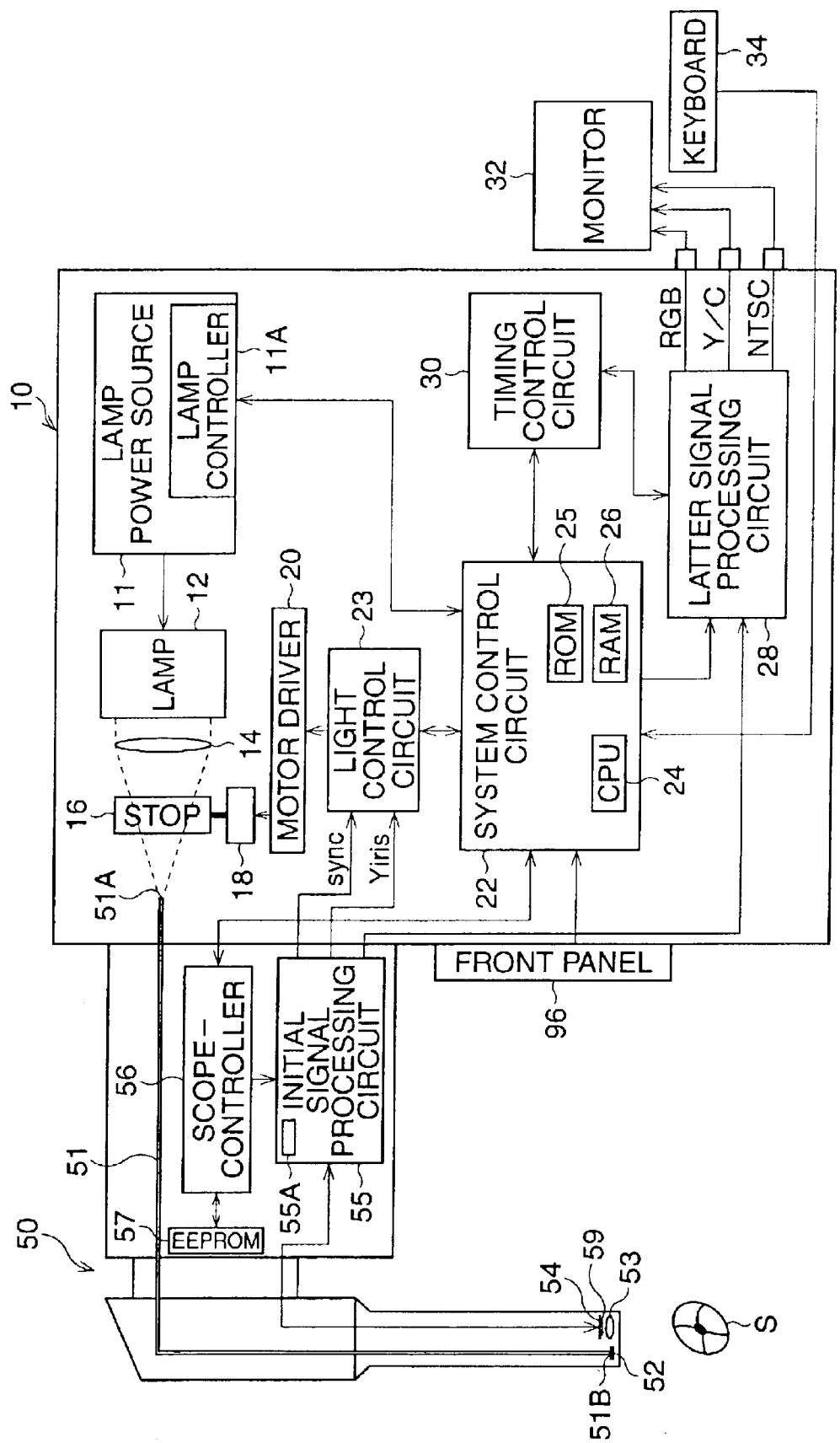
FIG. 1 is a block diagram of an electronic endoscope according to an embodiment.

FIG. 1 is a block diagram of an electronic endoscope according to an embodiment.

In the electronic endoscope, a video-scope 50 with an image sensor CCD (Charge-Coupled Device) 54, and a video-processor 10 that processes signals fed from the video-scope 50 is provided. A keyboard 34 and a monitor 32 for displaying a subject image are connected to the video-processor 10, and the video-scope 50 is detachably connected to the video-processor 10.

In the video-processor 10, a lamp 12 for illuminating a subject S is provided as a light source. When a lamp switch provided on the video-processor 10 (not shown) is turned ON, electric power is supplied from the lamp power source 11 including a lamp controller 11A to a lamp 12. Thus, the lamp 12 is turned ON. Light emitted from the lamp 12 is directed toward an incident surface 51A of a fiber-optic bundle 51 via a condenser lens 14. The fiber-optic bundle 51, provided through the video-scope 50, further directs the light to the distal end of the video-scope 50, the light passing through the fiber-optic bundle 51 exits from an end surface 51B of the fiber-optic bundle 51, and is emitted toward the subject S via a diffusion lens 52, so that the subject S is illuminated. In this embodiment, the lamp 12 is one of a halogen lamp, a xenon lamp, and a metal halide lamp.

The light reflected on the subject S passes through the objective lens 53 and reaches the CCD 54, so that the subject image S is formed on the light-receiving area of the CCD 54. For the color imaging process, in this embodiment, an on-chip color filter method using an on-chip color filter is applied. On a photo-sensor area of the CCD 54, a color filter 59, checkered by four color elements of Yellow (Y), Magenta (Mg), Cyan (Cy) and Green (G), is arranged such that four color elements are opposite the pixels arranged in the light-receiving area. In the CCD 54, color image signals, corresponding to light passing through the color filter 59, are generated by the photoelectric transform effect. The generated color image signals are composed of plural color signal components. Then, one field worth of image signals is read from the CCD 54 at regular time intervals in accordance with the so called "color difference line sequential system". In this embodiment, the NTSC standard is used as the color TV standard, accordingly, one field worth of image signals is read from the CCD 54 at 1/60 seconds time intervals, and then fed to an initial signal processing circuit 55.

In the initial signal processing circuit 55, as described below, various processes are performed for the image signals, so that video signals including luminance signals and color difference signals are generated. Further, a CCD driver (not shown) for driving the CCD 54 is provided in the initial signal processing circuit 55, driving signals fed to the CCD 54. The generated luminance signals and the color difference signals are fed to a latter signal processing circuit 28 and the luminance signals are further fed to a light-control circuit 23. Synchronizing signals are fed from the initial signal processing circuit 55 to the light-control circuit 23 in accordance with the output-timing of the luminance signals. In the latter signal processing circuit 28, a given process is performed for the input video signals, and the processed video signals are output to the monitor 32 as NTSC composite signals, S-video signals, and R, G, B component signals. Thus, the subject image is displayed on the monitor 32.

A system control circuit 22 including a CPU 24 (Central Processing Unit) controls the video-processor 10 and outputs control signals to the light-control circuit 23, the lamp controller 11A, the latter signal processing circuit 28, and soon. In a timing control circuit 30, clock pulses are output to each circuit in the video-processor 10, and synchronizing signals to be interleaved in the video signals are fed to the latter signal processing circuit 28. In a ROM (Read Only Memory) 25, lamp data associated with three types of lamp, halogen lamps, metal halide lamps and xenon lamps, is stored in advance.

A stop 16 is provided between the incident surface 51A and the condenser lens 14 to adjust an amount of light illuminating the subject S, and it opens and closes by using a motor 18. The light-control circuit 23 is constructed of a DSP (Digital Signal Processor), and controls the stop 16 such that the brightness of the subject image on the monitor 32 is maintained at a proper brightness. The light-control circuit 23 outputs control signals to a motor-driver 20 in accordance with the input luminance signals, and then the motor 18 is driven by the motor driver 20, so that the stop 16 opens or closes by a given amount.

In this embodiment, a scope-controller 56, which controls the video-scope 50, and an EEPROM (Electronic Erasable Programmable ROM) 57 are provided in the video-scope 50. In the EEPROM 57, in addition to data associated with the characteristics of the video-scope 50 (for example, pixel number), color adjustment data associated with the color adjustment process are stored.

The scope controller 56 controls the initial signal processing circuit 55 having a register 55A and accesses the data in the EEPROM 57. When the video-scope 50 is connected to the video-processor 10, various data is transmitted between the scope-controller 56 and the system control circuit 22. Namely, the data associated with the characteristics of the video-scope 50 is fed to the system control circuit 22, whereas the lamp data associated with the kind of the lamp 12 is fed to the scope-controller 56. Then, specific data corresponding to the lamp data is read from the EEPROM 57, and written in the register 55A. The initial signal processing circuit 55 processes the image signals in accordance with the written data.

A setting switch (not shown) for setting a base luminance level is provided on the front panel 96 of the video-processor 10. When the user operates the setting switch, an operational signal is fed to the system control circuit 22. The base luminance level data is temporarily stored in a RAM (Random Access Memory) 26, and is fed to the light-control circuit 23 when required. When the keyboard 34 is operated by the user to display character information, such as patient's information, the operational signal is fed to the system control circuit 22. Character signals are generated on the basis of the operational signal and are superimposed into the video signals at the latter signal processing circuit 28, so that the character information is displayed on the monitor 32 with the subject image.

Figure 2:
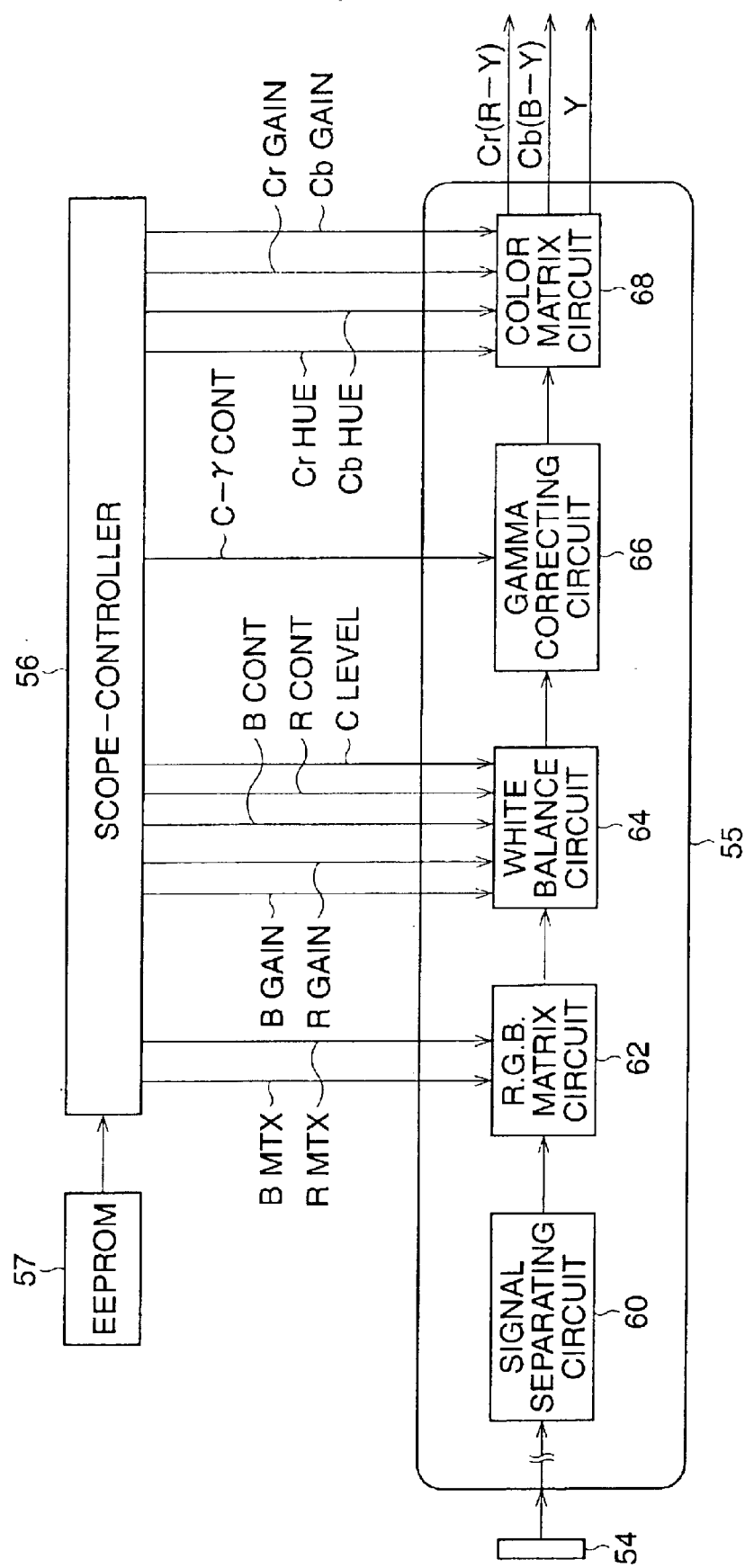
FIG. 2 is a view showing an initial signal processing circuit in detail.

FIG. 2 is a detailed view showing the initial signal processing circuit 55. FIG. 3 is a view showing a table associated with color adjustment data stored in the EEPROM 57.

The image signals read from the CCD 54 are amplified at an amplifier (not shown) in the initial signal processing circuit 55 and are then fed to a signal separating circuit 60. In the signal separating circuit 60, the color image signals are separated into initial luminance signals Ya and initial chrominance signals C', which are fed to an R, G, B matrix circuit 62. As is well known, the initial luminance signals Ya(=2R+3G+2B) are signals corresponding to the luminance signals Y. On the other hand, the initial chrominance signals C' includes initial color difference signals C'r(=2R−G) and C'b(=2B−G), which respectively correspond to color difference signals Cr (=R−Y) and color difference signals Cb (=B−Y).

In the R, G, B matrix circuit 62, primary color signals composed of "Red (R), Green (G), and Blue (B)" signal components are generated by following formula, on the basis of the initial luminance signals Ya and the initial chrominance signals C'. Note that, "α and β" indicates values of data "R MATX" and "B MTX" respectively, which are fed from the scope-controller 56.

$$R = C'r + \alpha \times Ya \quad (1)$$

$$B = -C'b + \beta \times (Ya - C'r) \quad (2)$$

$$G = Ya - C'r + C'b \quad (3)$$

The generated primary color signals "R, G, and B" are fed to a white balance circuit 64.

In the white balance circuit 64, a gain control is performed for the R, and B signal components of the primary color signals (R, G, B), in accordance with R and B gain values. The R and B gain values are respectively defined as the value of initial gain data "R GAIN", and the value of the initial gain data "B GAIN" at an initial setting of the electronic endoscope. The initial gain data "R GAIN and B GAIN", which are included in the color-adjustment data, are read from the EEPROM 57 by the scope-controller 56 and are then fed to the white balance circuit 64. On the other hand, while operating the electronic endoscope, the gain control is performed in accordance with gain data "R CONT and B CONT". The gain data "R CONT and B CONT" are read from the EEPROM 57 by the scope-controller 56 and are fed to the white balance circuit 64. Note that, the primary color signal "G" may be adjusted in accordance with a chrominance gain value, which is a value of gain data "C LEVEL" fed from the scope-controller 56. The processed primary color signals are fed to a gamma correcting circuit 66.

In the gamma correcting circuit 66, a gamma correction is performed for the primary color signals. The gamma characteristic curve depends upon a value of gamma characteristic data "C-γCON". The corrected signals are fed to a color matrix circuit 68. In the color matrix circuit 68, luminance signals Y and color difference signals Cb (=B−Y) and Cr (=R−Y) are generated on the basis of the primary color signals. The color difference signals Cb and Cr, constructing chrominance signals, are subjected to a phase adjustment in accordance with phase control data "Cb HUE" and "Cr HUE" fed from the scope-controller 56. Further, the output level of the color difference signals Cb and Cr are adjusted in accordance with the output level adjusting data "Cb GAIN and Cr GAIN" fed from the scope-controller 56. The luminance signals Y and the color difference signals Cb and Cr are fed to the processor 10.

The data used in the color adjustment process, described above, is stored in the EEPROM 57 in advance, and is stored at a given addresses in the EEPROM 57, as shown in FIG. 3. In this embodiment, color adjustment data are prepared for each of the three types of lamps 12, which are composed of a set of color adjustment data for the xenon lamp "KD", a set of color adjustment data for the metal halide lamp "MD", and a set of color adjustment data for the halogen lamp "HD". For example, when the lamp 12 in the processor 10 is a xenon lamp, the set of color adjustment data "KD" is read from the EEPROM 57 by the scope-controller 56, and initial R, B gain data "R GAIN and B GAIN", phase control data "Cb HUE" and so on are loaded to the register 55A in the initial signal processing circuit 55. Note that, the set of color adjustment data output from the scope-controller 56 is converted from analog data to digital data and is then fed to the initial signal processing circuit 55.

As each lamp has a particular spectrum characteristic, the value of data in a given set of color adjustment data is different from the value of corresponding data in another set of color adjustment data. For example, R initial gain data "R GAIN" and B initial gain data "B GAIN" in the set of color adjustment data "KD" for the xenon lamp, are substantially the same value, as light emitted from the xenon lamp is close to white-color light. On the other hand, as light emitted from the halogen lamp is close to yellow-color light, for the set of color adjustment data "HD" for the halogen lamp, the initial R gain data "R GAIN" is smaller than the initial B gain data "B GAIN".

Figure 4:
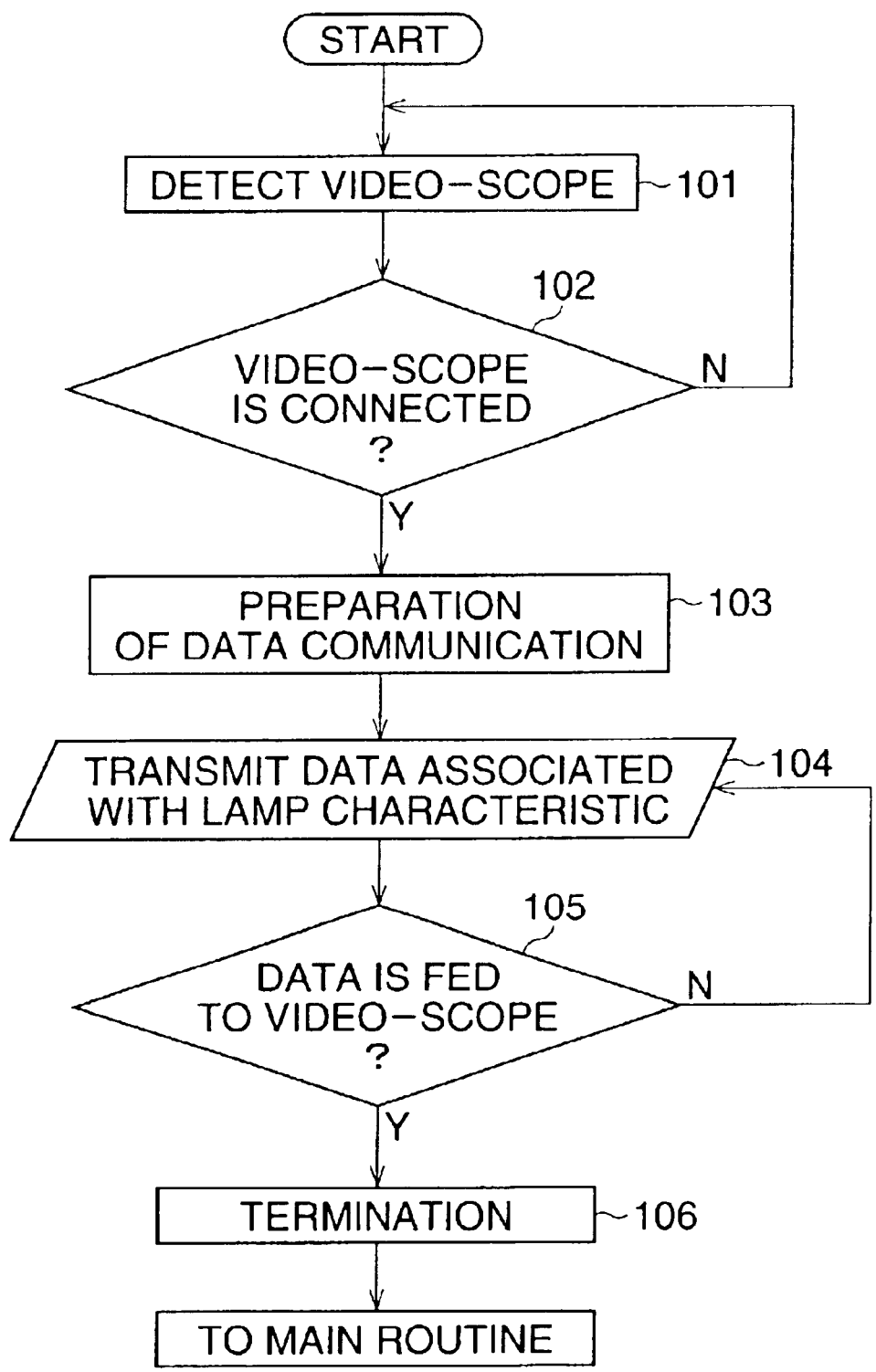
FIG. 4 is a view showing a flowchart of the data transmission process, which is performed at a system control circuit in the video-processor.
Figure 5:
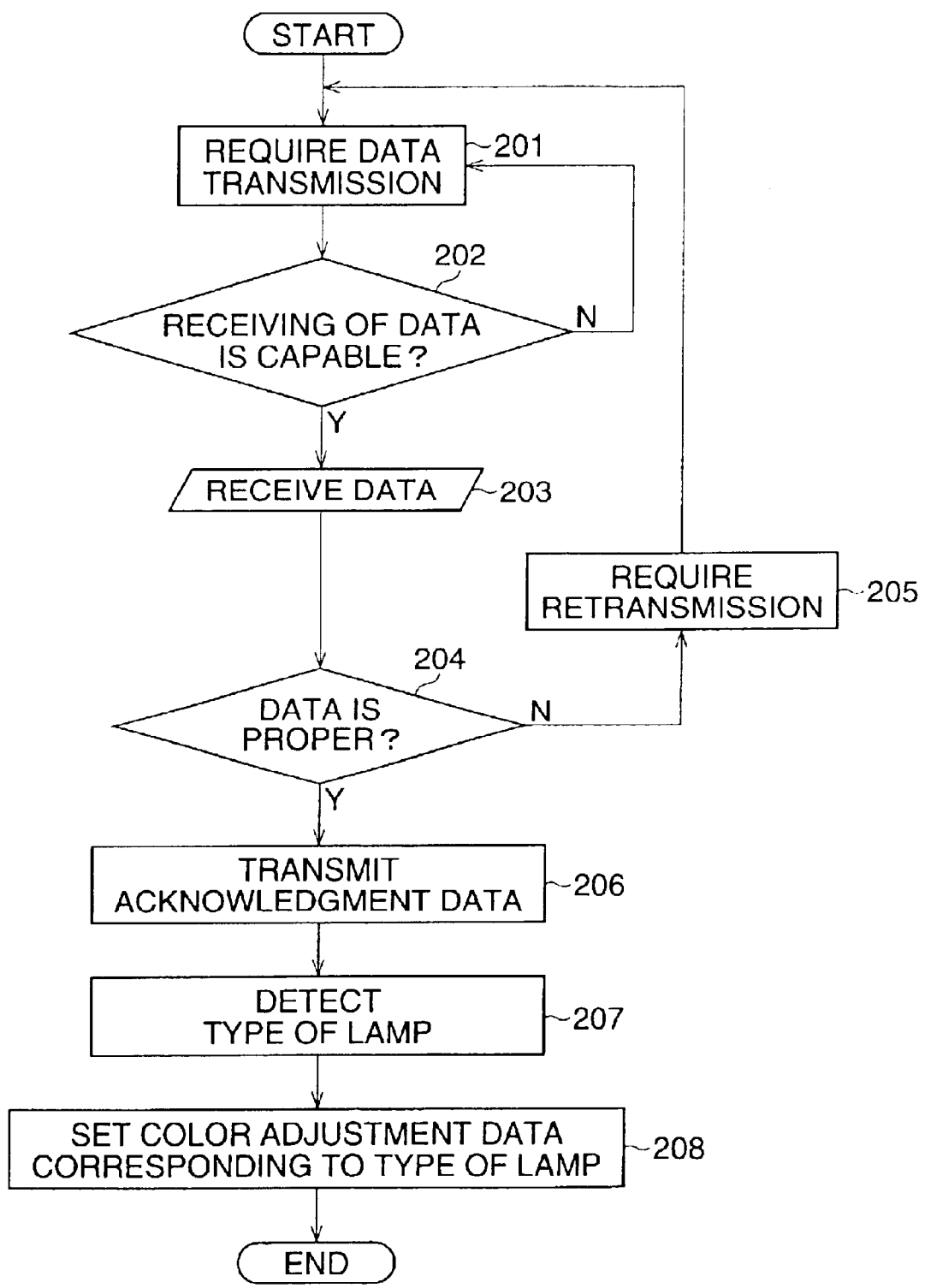
FIG. 5 is a view showing a flowchart of a data setting process performed at a scope-controller in the video-scope.

With reference to FIG. 4 and FIG. 5, the data setting process with color adjustment data is explained. FIG. 4 is a view showing a flowchart of the data transmission process, which is performed at the system control circuit 22. The process is performed as a subroutine of a main-routine (not shown). FIG. 5 is a view showing a flowchart of a data setting process performed at the scope-controller 56 in the video-scope 50.

In Step 101, a detecting signal associated with connection of the video-scope 50 is fed to the system control circuit 22. In Step 102, it is determined whether the video-scope 50 is connected to the video-processor 10. When it is determined that the video-scope 50 is not connected to the video-processor 10, the process returns to Step 101. On the other hand, when it is determined that the video-scope 50 is connected to the video-processor 10, the process goes to Step 103. In Step 103, the preparation for a data communication with the video-scope 50 is performed. Then, in Step 104, lamp data associated with the type of lamp 12 is fed from the system control circuit 22 to the scope-controller 56. After Step 104 is performed, the process goes to Step 105.

In Step 105, it is determined whether acknowledgment data, indicating that the video-scope 50 has received the lamp data, is fed from the scope-controller 56. When it is determined that the acknowledgment data has not been fed from the scope-controller 56, the process returns to Step 104. On the other hand, when it is determined that the acknowledgment data has been fed from the scope-controller 56, the process goes to Step 106 and communication with the video-scope 50 is terminated. After communication is terminated, the process returns to the main routine.

The process shown in FIG. 5 is started when the video-scope 50 is connected to the video-processor 10. In Step 201, a process that requires the transmission of lamp data is performed. Then, in Step 202, it is determined whether the lamp data can be received at the scope-controller 56. When it is determined that the lamp data cannot be received, the process returns to Step 201. On the other hand, when it is determined that the lamp data can be received, the process goes to Step 203.

In Step 203, data is received at the scope-controller 56. Then, in Step 204, it is determined whether the data fed from the system control circuit 22 is proper, namely, whether data fed from the system control circuit 22 is the lamp data. When it is determined that the data fed from the system control circuit 22 is not proper, namely, other data has been fed to the scope-controller 56, the process goes to Step 205, wherein retransmission of the lamp data is required. On the other hand, when it is determined that the data fed from the system control circuit 22 is proper lamp data, the process goes to Step 206.

In Step 206, the acknowledge data is fed to the system control circuit 22. Then, in Step 207, the type of the lamp 12 is determined in accordance with the received lamp data. In Step 208, a set of color adjustment data corresponding to the received lamp data, is read from the EEPROM 57 and is fed to the initial signal processing circuit 55. For example, if the lamp 12 is the xenon lamp, the color-adjustment data "KD" is read from the EEPROM 57.

In this way, in this embodiment, a series of color adjustment data composed of the data for a halogen lamp "HD", a xenon lamp "KD", and a metal halide lamp "MD", is stored in the EEPROM 57 in the video-scope 50. When the video-scope 50 is connected to the video-processor 10, the lamp data is fed to the video-scope 50 and then the kind of lamp 12 is detected. The set of color adjustment data corresponding to the lamp data is read from the EEPROM 57 and is then fed to the initial signal processing circuit 55. The initial signal processing circuit 55 performs the color adjustment process, which includes the signal separating process, the primary color signal generating process, the white balance process, the gamma correcting process, and the video signal generating process, for the image signals read from the CCD 54 in accordance with the set of color adjustment data fed from the EEPROM 57.

In this embodiment, the complementary filter is used at the CCD 54 and the color difference line sequential system is applied as a signal reading method, however, a primary color (R, G, B) filter and a Bayer method may be applied. In this case, the initial signal processing circuit 55 is constructed in accordance with the primary color (R, G, B) filter and the Bayer method.

For the imaging process, an R, G, B sequential system using a rotating color filter may be used in place of the on-chip color filer method. Further, for the TV standard, other methods, such as a PAL method, may be applied in place of the NTSC method.

For the lamp 12, an LED may be applied in place of the gas lamp (electric discharge lamp). In this case, a set of color adjustment data corresponding to the spectrum distribution of the LED is prepared.

For the series of color adjustment data, common data may be used. For example, a value of the gamma correcting data "C-γCON" may be set to the same value for each lamp.

The color adjustment process may be performed in the video-processor 10. Further, the video-processor 10 may be composed of a light source apparatus including the lamp 12 and a signal processing apparatus, which are prepared separately. In this case, when the light source apparatus is changed, the video-scope can be used directly without being changed.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. P2001-181249 (filed on Jun. 15, 2001) which is expressly incorporated herein, by reference, in its entirety.

What is claimed is:

1. An electronic endoscope including a video-scope with an image sensor and a video-processor, to which said video-scope is detachably connected, said electronic endoscope comprising:

a light source that emits illuminating light for illuminating a subject, color image signals corresponding to the subject, which include a plurality of color signal components corresponding to a plurality of color elements, being read from said image sensor;

a color adjuster that performs a color adjustment process for the color image signals to generate video signals; and a light source detector that detects the type of said light source, wherein said color adjuster performs the color adjustment process in accordance with the type of said light source such that color in a displayed subject image is properly reproduced.

2. The electronic endoscope of claim 1, wherein said color adjuster is provided in said video-scope.

3. The electronic endoscope of claim 2, wherein said video-scope includes a color adjustment data memory for storing a series of color adjustment data corresponding to plural types of light source, and wherein a set of color adjustment data corresponding to the type of said light source is selected from the series of color adjustment data and read from said color adjustment data memory, and said color adjuster performs the color adjustment process in accordance with the set of color adjustment data.

4. The electronic endoscope of claim 3, wherein said light source is provided in said video-processor, said color adjuster has a memory area for loading and storing the set of color adjustment data, said video-processor has a light source memory for storing light source data, and said video-scope includes a data setter that sets the set of color adjustment data to said memory area, wherein said light source detector detects the type of said light source in accordance with the light source data and said data setter sets the set of color adjustment data corresponding to the light source data when said video-scope is connected to said video-processor.

5. The electronic endoscope of claim 1, wherein said light source is one of a xenon lamp, a metal halide lamp, and a halogen lamp, and said lamp detector detects the type of said lamp by detecting which lamp of said xenon lamp, said metal halide lamp, and said halogen lamp is being used.

6. The electronic endoscope of claim 1, wherein said color adjuster includes a white balance adjuster that adjusts a relative ratio of R, G, B signal components, generated from the color image signals, by gain-control.

7. The electronic endoscope of claim 1, wherein said color adjuster includes:

a primary color signal generator that generates primary color image signals composed of R signal components corresponding to the color Red, G signal components corresponding to the color Green, and B signal components corresponding to the color Blue, on the basis of the color image signals read from said image sensor;

a white balance adjuster that adjusts a relative ratio of the R, G, B signal components in the primary color signals by gain-control;

a gamma corrector that performs a gamma correction for the white balance adjusted primary color image signals; and a video signal generator that generates the video signals including luminance signals and color difference signals on the basis of said gamma corrected primary color image signals.

8. A video-scope provided in an electronic endoscope having a light source for illuminating a subject, said video-scope having an image sensor and being detachably connected to a video-processor, color image signals corresponding to the subject, which include a plurality of color signal components corresponding to a plurality of color elements, being read from said image sensor, said video-scope comprising:

a color adjuster that performs a color adjustment process for the color image signals to generate video signals; and a light source detector that detects the type of said light source, wherein said color adjuster performs the color adjustment process in accordance with the type of said light source such that color in a displayed subject image is properly reproduced.

9. The video-scope of claim 8, wherein said light source detector detects the type of said light source from a plurality of light sources.

10. The electronic endoscope of claim 1, wherein said light source detector detects the type of said light source from a plurality of light sources.

* * * * *